US012655824B2

(12) United States Patent     (10) Patent No.:   US 12,655,824 B2

Huang et al.     (45) Date of Patent:   Jun. 16, 2026

(54) TURBINE DEVICE, POWER APPARATUS AND POWER INTEGRATED SYSTEM OF ELECTRIC POWER SYSTEM

(71) Applicant: Ching-Cheng Huang, Tainan City (TW)

(72) Inventors: Ching-Cheng Huang, Tainan City (TW); Chien-Jui Huang, Tainan City (TW)

(73) Assignee: Ching-Cheng Huang, Tainan City (TW)

( * ) Notice: Subject to any disclaimer, the term of this patent is extended or adjusted under 35 U.S.C. 154(b) by 74 days.

(21) Appl. No.: 18/467,744

(22) Filed: Sep. 15, 2023

(65) Prior Publication Data

US 2024/0093668 A1    Mar. 21, 2024

(30) Foreign Application Priority Data

Sep. 15, 2022   (TW) ................................. 111134821

(51) Int. Cl.
| | |
|---|---|
| *F03B 3/14* | (2006.01) |
| *F03D 3/00* | (2006.01) |
| *F03D 3/04* | (2006.01) |
| *F03D 3/06* | (2006.01) |
| *F03D 15/00* | (2016.01) |

(52) U.S. Cl.
CPC ............... *F03D 3/067* (2013.01); *F03B 3/14* (2013.01); *F03D 3/005* (2013.01); *F03D 3/0436* (2013.01); *F03D 15/201* (2023.08); *F05B 2240/13* (2013.01); *F05B 2240/217* (2013.01); *F05B 2240/37* (2020.08); *F05B 2260/4022* (2013.01)

(58) Field of Classification Search
None
See application file for complete search history.

(56) References Cited

U.S. PATENT DOCUMENTS

| | | | | | | |
|---|---|---|---|---|---|---|
| 4,517 | A | * | 5/1846 | Hand | ........................ | B63H 1/04 |
| | | | | | | 415/141 |
| 4,843 | A | * | 11/1846 | Rowand | ................ | F03B 13/264 |
| | | | | | | 415/3.1 |

(Continued)

FOREIGN PATENT DOCUMENTS

| | | |
|---|---|---|
| CN | 102011674 A | 4/2011 |
| CN | 202007743 U | 10/2011 |

(Continued)

*Primary Examiner* — Tulsidas C Patel
*Assistant Examiner* — S. Mikailoff
(74) *Attorney, Agent, or Firm* — CKC & Partners Co., LLC

(57) ABSTRACT

A turbine of a power generating system includes a rotary body, blades, stoppers and elastic members. Each of the blades includes a connecting side and an active side opposite to the connecting side, and the blades are disposed on the rotary body at intervals by a predetermined distance, in which the blades are pivotally connected to the rotary body through the connecting sides. The stoppers respectively correspond to the blades and are disposed over the rotary body for limiting expansion angles of the blades. Each of the elastic members includes a fixed end and a moving end opposite to the fixed end, and the fixed ends attach to the rotary body, and the moving ends respectively attach to the blades. Each of the blades pivots between an expanded position and a closed position.

15 Claims, 8 Drawing Sheets

(56) References Cited

U.S. PATENT DOCUMENTS

| | | | | |
|---|---|---|---|---|
| 302,769 | A | * | 7/1884 | Pallausch ................. F03D 3/067 |
| | | | | 415/141 |
| 643,557 | A | * | 2/1900 | Swearingen ........ F03B 13/1815 |
| | | | | 60/505 |
| 1,109,839 | A | * | 9/1914 | Henry ................... F03B 17/061 |
| | | | | 415/141 |
| 1,578,835 | A | * | 3/1926 | Kothe ................... F03B 17/063 |
| | | | | 416/197 A |
| 5,009,568 | A | * | 4/1991 | Bell ...................... F03B 13/145 |
| | | | | 415/3.1 |
| 6,006,518 | A | * | 12/1999 | Geary ................... F03B 17/065 |
| | | | | 60/398 |
| 8,120,196 | B1 | * | 2/2012 | Neese ........................ H02P 9/04 |
| | | | | 416/119 |
| 8,419,367 | B2 | * | 4/2013 | Fite .......................... F03D 3/067 |
| | | | | 416/204 R |
| 2008/0231057 | A1 | * | 9/2008 | Zeuner ................. F03B 17/065 |
| | | | | 416/106 |
| 2008/0309089 | A1 | * | 12/2008 | Lin ......................... F03D 3/067 |
| | | | | 290/54 |
| 2010/0301609 | A1 | | 12/2010 | Kim et al. |
| 2014/0217738 | A1 | * | 8/2014 | Lipman ................. F03B 13/264 |
| | | | | 290/54 |
| 2024/0093668 | A1 | * | 3/2024 | Huang .................. F03B 17/065 |

FOREIGN PATENT DOCUMENTS

| | | | |
|---|---|---|---|
| CN | 102369352 | A | 3/2012 |
| CN | 102449299 | A | 5/2012 |
| CN | 110454309 | A | 11/2019 |
| DE | 327120 | C | 10/1920 |
| JP | S54-133239 | A | 9/1979 |
| JP | 2012-528970 | A | 11/2012 |
| JP | 2018-505344 | A | 2/2018 |
| TW | 201500642 | A | 1/2015 |
| TW | I522529 | B | 2/2016 |
| TW | M636882 | U | 1/2023 |
| WO | 2017025122 | A1 | 2/2017 |

* cited by examiner

220A

220A

220A

220A

TURBINE DEVICE, POWER APPARATUS AND POWER INTEGRATED SYSTEM OF ELECTRIC POWER SYSTEM

RELATED APPLICATIONS

This application claims priority to Taiwan Application Serial Number 111134821, filed Sep. 15, 2022, which is herein incorporated by reference in its entirety.

BACKGROUND

Technical Field

The present disclosure relates to a device, an apparatus and a system. More particularly, the present disclosure relates to a turbine, a power apparatus and a power integrated system of a power generating system.

Description of Related Art

As a rapid development of science and technology and economy, a need that people require electric power is increased with increasing days. While usage for generating green power can decrease an effect of lacking energy resources and decrease the generation of pollutants. There are hydropower, wind power, solar power, geothermal power, etc., by methods of usage for generating green power. The promotion for the energy conversion efficiency and saving the installation costs of power systems are always the direction of continuous research in this field.

SUMMARY

The purpose of the present disclosure is to provide a turbine of a power generating system which reduces an obstacle by expanded or closed blades when rotating, and eliminates negative power of rotation, thereby increasing efficiency of converting fluid kinetic energy into mechanical energy.

An aspect of the present disclosure is to provide the turbine of the power generating system, in which the turbine includes a rotary body, blades, stoppers and elastic members. Each of the blades includes a connecting side and an active side opposite to the connecting side, and the blades are disposed on the rotary body at intervals by a predetermined distance, in which the blades are pivotally connected to the rotary body through the connecting sides. The stoppers respectively correspond to the blades and are disposed over the rotary body for limiting expansion angles of the blades. Each of the elastic members includes a fixed end and a moving end opposite to the fixed end, and the fixed ends attach to the rotary body, and the moving ends respectively attach to the blades. Each of the blades pivots between an expanded position and a closed position. When the blades are in the expanded positions, the active sides are away from the rotary body, and the blades are respectively against the stoppers. When the blades are in the closed positions, the active sides are adjacent to the rotary body, and the elastic members are in deformation states.

According to an embodiment of the present disclosure, the rotary body is in a cylinder shape, the blades are disposed at intervals in a circumferential direction of the rotary body, each of the blades is a curved plate and has a concave surface and a convex surface opposite to the concave surface, and the stoppers are respectively disposed corresponding to the blades and face the convex surfaces of the corresponding blades. When the blades are in the expanded positions, the convex surfaces of the blades are respectively against the stoppers. When the blades are in the closed positions, the concave surfaces of the blades are adjacent to the rotary body, and a radius of a curvature of each of the blades is substantially equivalent to a radius of the rotary body.

According to another embodiment of the present disclosure, the turbine further includes anti-friction members respectively disposed on the blades, and each of the anti-friction members includes one of a roller and a smooth coating.

According to another embodiment of the present disclosure, the turbine further includes pivotal members and cover sheets, in which the pivotal members are disposed between the connecting sides and the rotary body so that the blades pivot relative to the rotary body, and the cover sheets are made of soft and impermeable material and the cover sheets are respectively disposed across gaps between the connecting sides and the rotary body.

Another purpose of the present disclosure is to provide a power apparatus of the power generating system, and thus the process in which blades are expanded and closed is more successful by the coordination of a channel structure group and a turbine including the expanded or closed blades.

Another aspect of the present disclosure is to provide the power apparatus of the power generating system, in which the power apparatus includes at least one turbine and a channel structure group. The at least one turbine includes a rotary body and blades, and the blades are pivotally connected to the rotary body. The channel structure group includes spacing walls disposed at intervals along a direction, in which any two adjacent ones of the spacing walls define a channel space for accommodating the at least one turbine, and the at least one turbine is adjacent to one of the spacing walls. When the at least one turbine is driven to rotate by a fluid, the blades touch the adjacent one of the spacing walls, and are closed and near to the rotary body.

According to another embodiment of the present disclosure, the channel structure group further includes at least one diversion wall, the at least one diversion wall is disposed between any adjacent two of the spacing walls, and divides an inlet communicating through the channel space into two sub-inlets. The blades of the at least one turbine are driven to rotate by the fluid entering the two sub-inlets. When the blades of the at least one turbine are closed, the blades are expanded by a tangential fluid flowing through the at least one diversion wall.

According to another embodiment of the present disclosure, the at least one diversion wall occupies a portion of the inlet and extends in a direction from one of the sub-inlets to the other one of the sub-inlets.

According to another embodiment of the present disclosure, the at least one diversion wall is adjacent to one of the spacing walls.

According to another embodiment of the present disclosure, an inner surface of the at least one diversion wall facing the channel space is a curved surface.

According to another embodiment of the present disclosure, each of the spacing walls is curved along a rotational direction of the at least one turbine.

According to another embodiment of the present disclosure, the channel structure group further includes anti-friction members, each of the anti-friction members includes one of a roller and a smooth coating, each of the spacing walls includes a contact surface, the anti-friction members are respectively disposed on the contact surfaces of the spacing walls.

Another purpose of the present disclosure is to provide a power integrated system of the power generating system in which the power generated by power devices is integrated in parallel or in series to transmit to a power generator by one-way transmission mechanisms, thereby saving amounts of the power generators which are needed and reducing the installation costs.

Another aspect of the present disclosure is to provide the power integrated system of the power generating system, in which the power integrated system includes power devices and one-way transmission mechanisms. Each of the power devices includes a rotary body, and the rotary bodies are driven to rotate for generating power. Each of the one-way transmission mechanisms includes a one-way transmission wheel and a transmission member, the one-way transmission wheels are disposed on the rotary body of one of the power devices, the transmission members are respectively disposed between the rotary bodies of the other power devices and the one-way transmission wheels to respectively transmit the power generated by the other power devices to the one-way transmission wheels, and the power is transmitted to the rotary body where the one-way transmission wheels are disposed via the one-way transmission wheels, and each of the one-way transmission mechanisms is configured to transmit the power to the one-way transmission wheel via the transmission member when the rotary body where the transmission member is disposed rotates in a rotational direction, so that the rotary body where the one-way transmission wheel is disposed rotates in the same rotational direction, the power generated by the power devices is integrated in parallel via the one-way transmission mechanisms.

According to another embodiment of the present disclosure, the one-way transmission wheel of each of the one-way transmission mechanisms includes one of a ratcheting freewheel mechanism, a combination of a one-way bearing and a gear, and a combination of a one-way bearing and a pulley, and the transmission member of each of the one-way transmission mechanisms includes one of an assembly of a gear and a chain, an assembly of a pulley and a belt, and a gear assembly.

Another aspect of the present disclosure is to provide the power integrated system of the power generating system, in which the power integrated system includes power devices and at least one one-way transmission mechanism. Each of the power devices includes a rotary body, and the rotary bodies are driven to rotate for generating power. The at least one one-way transmission mechanism includes a one-way transmission wheel and a transmission member, and the at least one one-way transmission mechanism is disposed between any two of the power devices, in which the one-way transmission wheel of the at least one one-way transmission mechanism is disposed on the rotary body of one of the power devices, and the transmission member of the at least one one-way transmission mechanism is disposed between the other power device and the one-way transmission wheel to transmit the power generated by the other power device to the one-way transmission wheel, and the power is transmitted to the rotary body where the one-way transmission wheel is disposed via the one-way transmission wheel, and the at least one one-way transmission mechanism is configured to transmit the power to the one-way transmission wheel via the transmission member when the rotary body where the transmission member is disposed rotates in a rotational direction, so that the rotary body where the one-way transmission wheel is disposed rotates in the same rotational direction, the power generated by the power devices is integrated in series by a unidirectional power transmission path via the at least one one-way transmission mechanism.

According to another embodiment of the present disclosure, the one-way transmission wheel of the at least one one-way transmission mechanism includes one of a ratcheting freewheel mechanism, a combination of a one-way bearing and a gear, and a combination of a one-way bearing and a pulley, and the transmission member of the at least one one-way transmission mechanism includes one of an assembly of a gear and a chain, an assembly of a pulley and a belt, and a gear assembly.

According to another embodiment of the present disclosure, each of the power devices is a waterwheel.

According to another embodiment of the present disclosure, the rotary body of each of the power devices is driven by wind for generating power.

BRIEF DESCRIPTION OF THE DRAWINGS

The disclosure can be more fully understood by reading the following detailed description of the embodiment, with reference made to the accompanying drawings as follows.

DETAILED DESCRIPTION

Embodiments of the present disclosure are described in detail as follows. However, it can be understood that, the embodiments are provided many applicable concepts, which may implement in any kind of specific context. The embodiments which are described and disclosed in this context are merely provided for illustration and not intended to limit the scope of the present disclosure.

Terms used in this context are merely for distinguishing specific embodiments and not intended to limit the patent scope. Unless otherwise limited, the term "a" or "the" in a singular form may also be used to represent in a plural form.

Figure 1A:
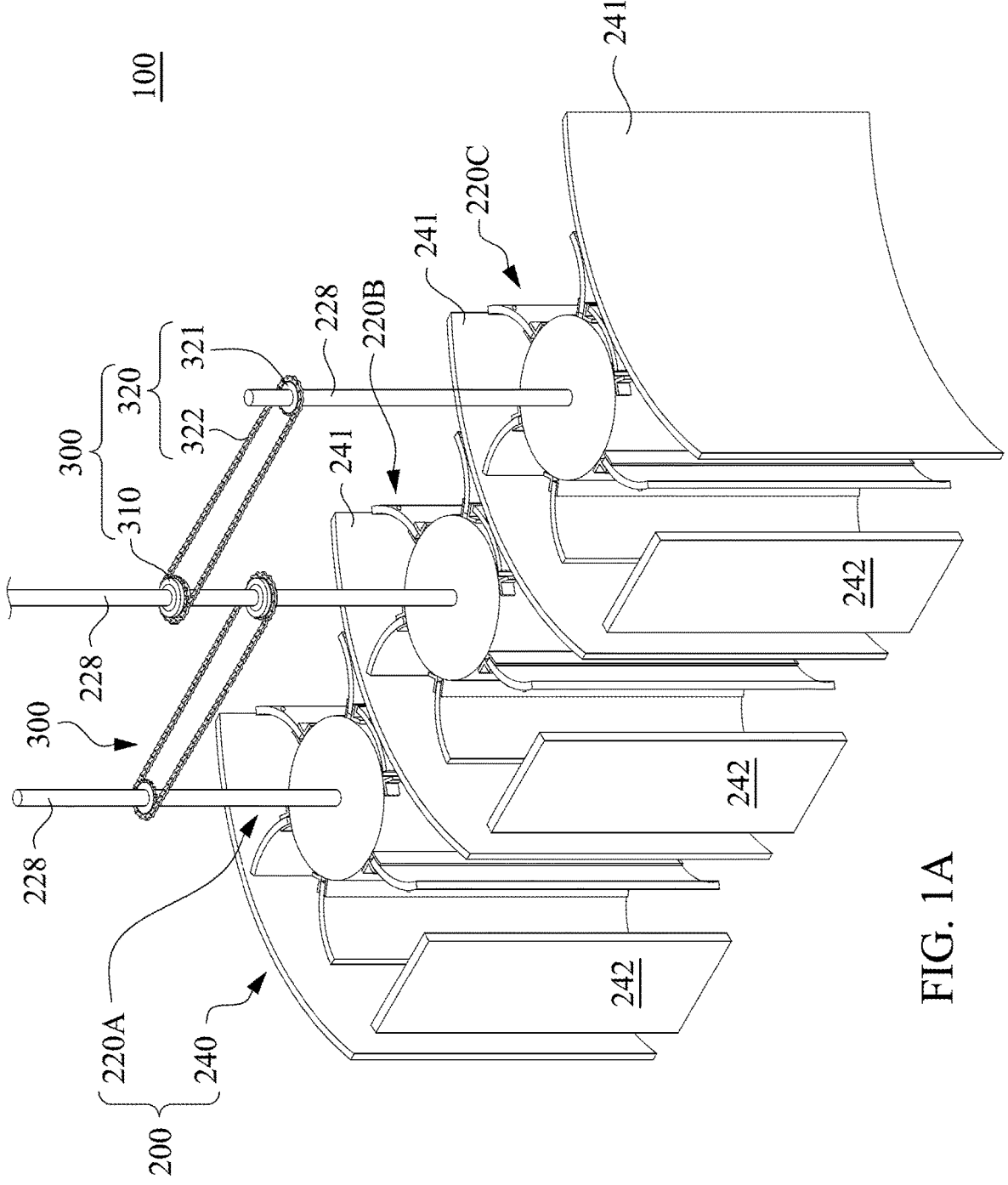
FIG. 1A is a perspective view of a power generating system in accordance with some embodiments of the present disclosure.
Figure 1B:
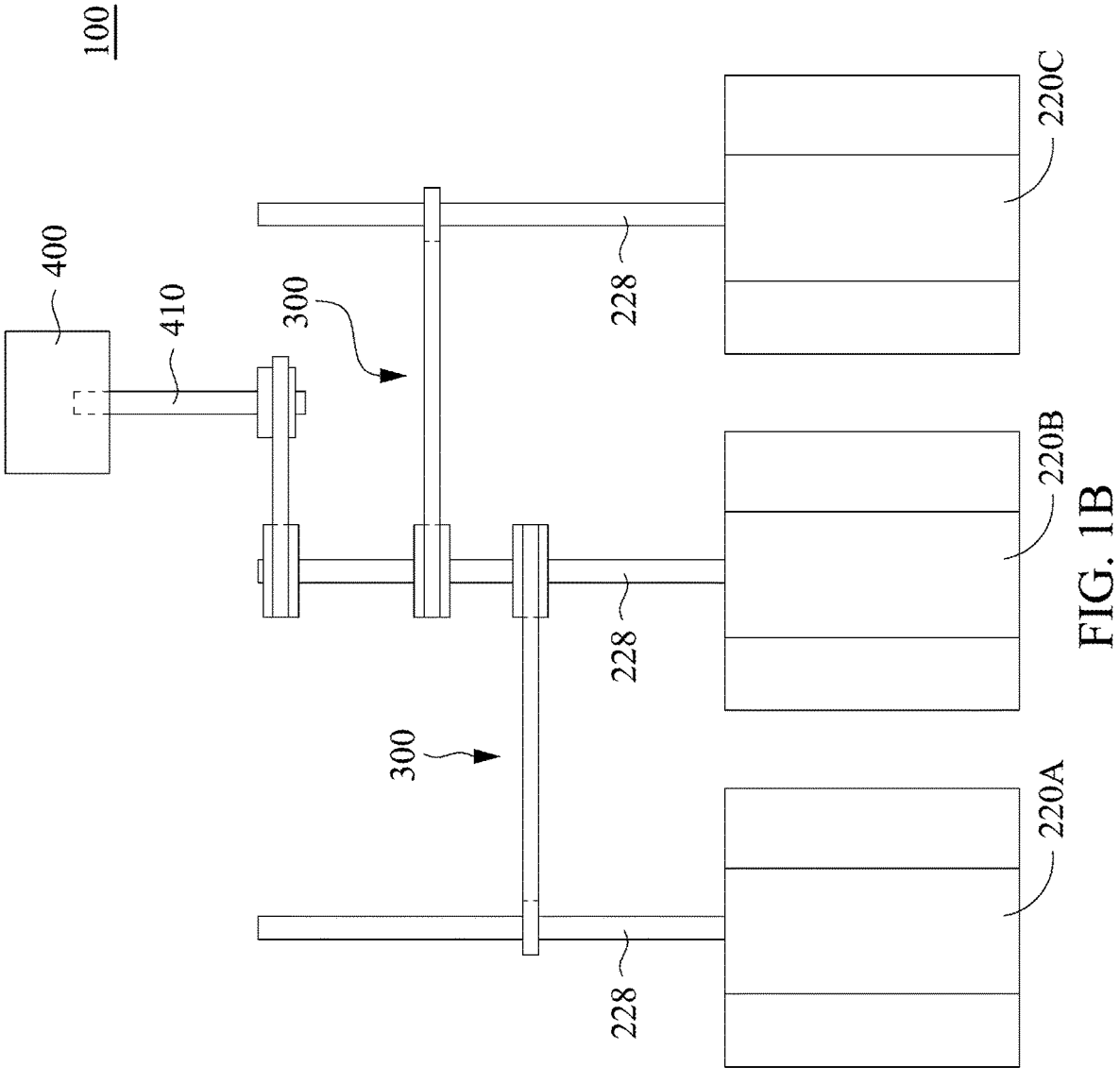
FIG. 1B is a schematic side view of the power generating system in FIG. 1A.

Reference is made to FIGS. 1A and 1B. FIG. 1A is a perspective view of a power generating system 100 in accordance with some embodiments of the present disclosure, and FIG. 1B is a schematic side view of the power generating system 100 in FIG. 1A. The power generating system 100 may be a hydropower generating system (as shown in FIG. 1A) or another suitable system for generating power. The power generating system 100 includes a power apparatus 200, one-way transmission mechanisms 300 and a power generator 400. The power apparatus 200 includes turbines 220A, 220B and 220C and a channel structure group 240. Other number of turbines (e.g., 1, 2, or more) may be arranged in the power apparatus 200 in accordance with other embodiments.

Figure 3:
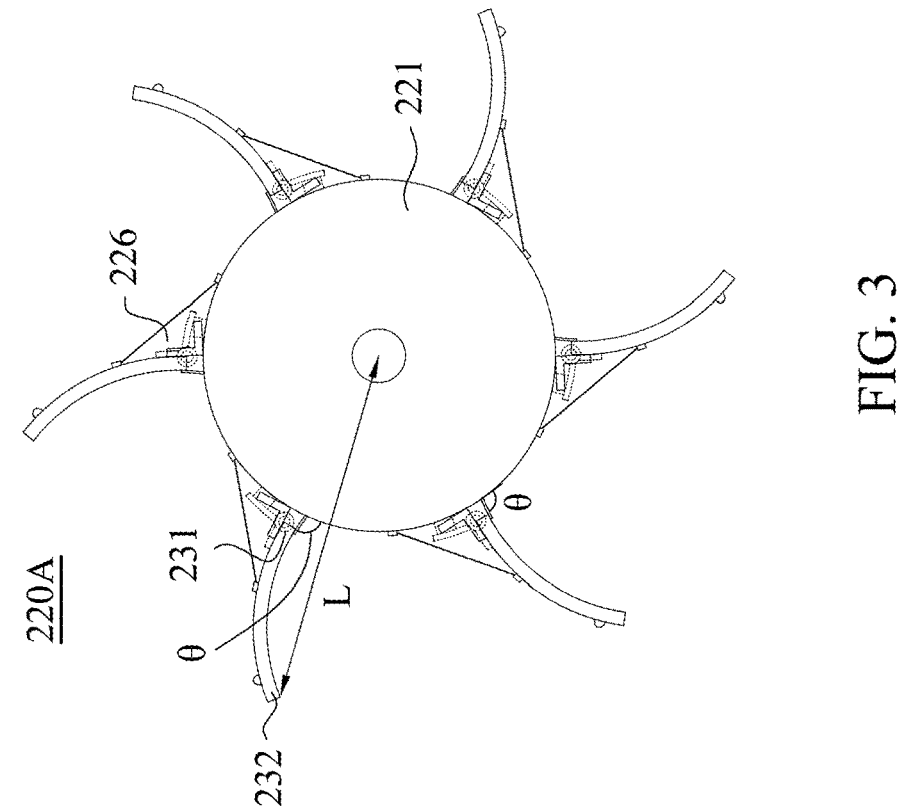
FIG. 3 is a top view of the turbine in the expanded status in FIG. 2.
Figure 2:
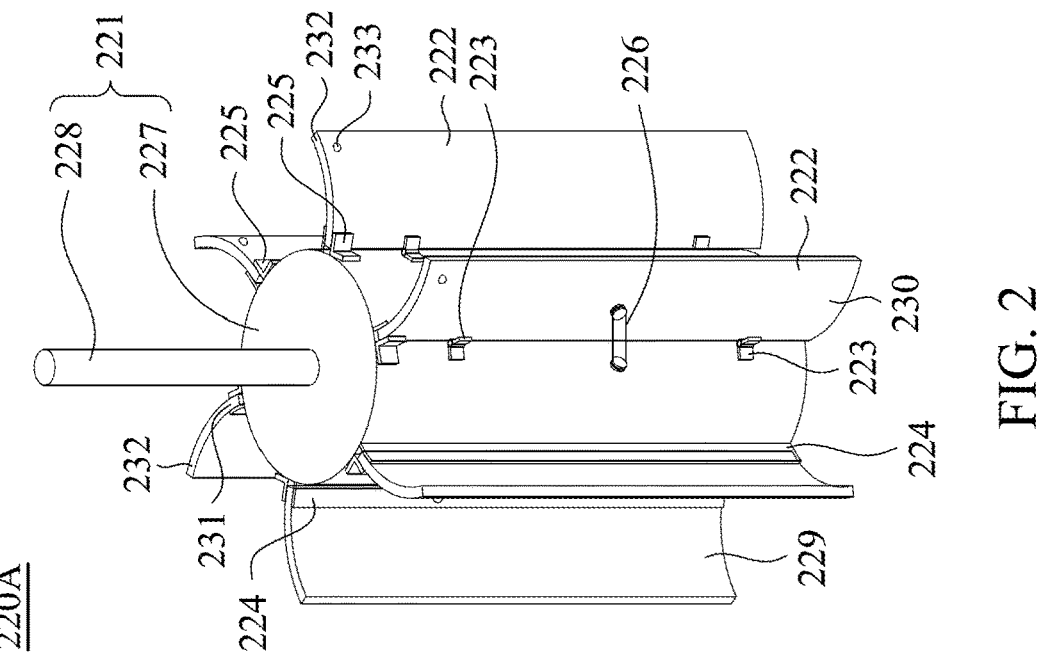
FIG. 2 is a perspective view of a turbine in an expanded status in accordance with some embodiments of the present disclosure.

FIGS. 2 and 3 are respectively a perspective view and a top view of the turbine 220A in an expanded status. The structures of the turbines 220A, 220B and 220C are substantially the same. The turbine 220A includes a rotary body 221, blades 222, pivotal members 223, cover sheets 224, stoppers 225 and elastic members 226.

The rotary body 221 includes a core 227 and a rod 228. The core 227 may be, but is not limited to, in a cylinder shape, and the rod 228 is firmly engaged to the core 227. The blades 222 are pivotally connected to the rotary body 221 by the pivotal members 223. As shown in FIG. 2, each blade 222 may be a curved rectangle plate of which the length may be substantially equivalent to the length of the core 227. Each blade 222 includes a concave surface 229 and a convex surface 230 opposite to the concave surface 229. In some embodiments, the radius of the curvature of each blade 222 may be approximately equivalent to the radius of the core 227. Further, each blade 222 includes a connecting side 231 and an active side 232 opposite to the connecting side 231. Each pivotal member 223 is disposed between the connecting side 231 of one of the blades 222 and the rotary body 221 so that the blades 222 are disposed on the rotary body 221 at intervals by a predetermined distance in a circumferential direction of the rotary body 221, and pivot relative to the rotary body 221. The pivotal members 223 may be hinges and/or other members suitable for pivotally connecting the blades 222 to the core 227.

The blades 222 may be expanded or closed relative to the rotary body 221. In some embodiments, gaps may be present between the connecting sides 231 of the blades 222 and the rotary body 221, and the cover sheets 224 are respectively disposed across the gaps between the connecting sides 231 of the blades 222 and the rotary body 221 for blocking fluid to flow therethrough when the turbine 220A is driven. The cover sheets 224 may be made of soft and impermeable material, such as soft plastic material or the like. The stoppers 225 respectively correspond to the blades 222 and are disposed over the rotary body 221, and respectively face the convex surfaces 230 of the corresponding blades 222 for limiting the expansion angles of the blades 222. Each elastic member 226 includes a fixed end and a moving end opposite to the fixed end. The fixed ends of the elastic members 226 attach to the rotary body 221, and the moving ends of the elastic members 226 respectively attach to the blades 222. Each elastic member 226 is initially disposed in a deformed state between the rotary body 221 and the attached blade 222. The elastic members 226 remain deformed when the blades 222 move. The positions where the elastic members 226 are disposed allow the elastic members 226 to remain deformed. The elastic members 226 respectively provide restoration forces for the blades 222 to open (e.g., shown in FIGS. 2 and 3) when the blades 222 are closed (e.g., shown in FIGS. 4 and 5). The elastic members 226 may be, for example, rubber bands and/or springs.

Each blade 222 pivots relative to the rotary body 221 between an expanded position and a closed position. When each blade 222 is in the expanded position, the active side 232 of each blade 222 is away from the rotary body 221, a distance L between the active side 232 of each blade 222 and the center of the rod 228 is the farthest, and the connecting side 231 of each blade 222 is against the corresponding stopper 225 (the convex surface 230 of each blade 222 is against the corresponding stopper 225). In this example, the angle θ between the connecting side 231 of each blade 222 and the tangent of the rotary body 221 corresponding thereto is approximately 90 degrees. The blades 222 have the longest lever arms (i.e. the distance L) for reaching the maximum torque when the turbine 220A is in the expanded status.

Figure 5:
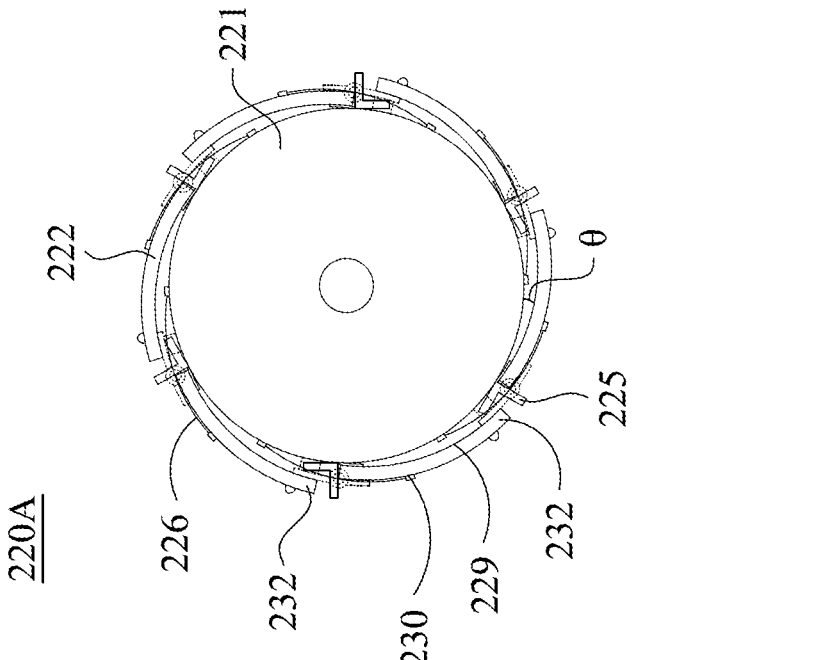
FIG. 5 is a top view of the turbine in the closed status in FIG. 4.
Figure 4:
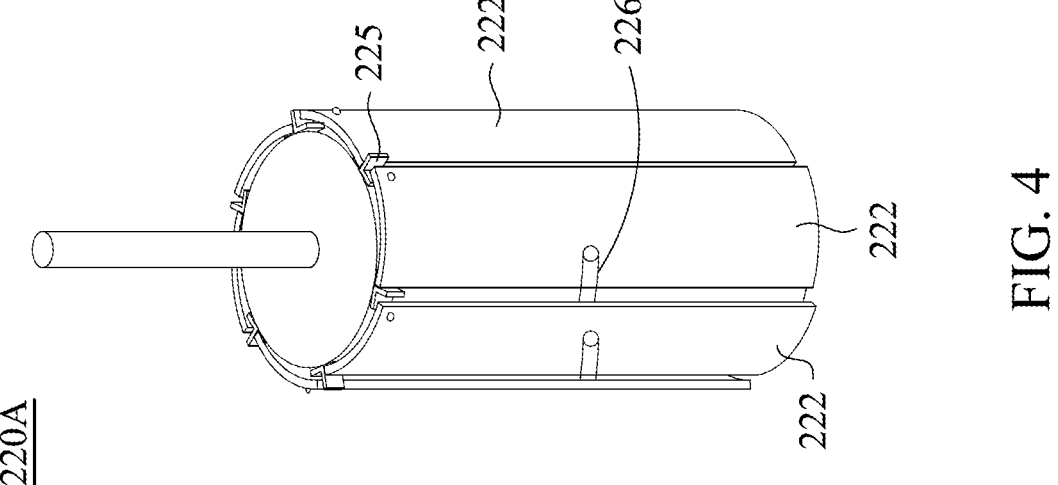
FIG. 4 is a perspective view of the turbine in a closed status in accordance with some embodiments of the present disclosure.

FIGS. 4 and 5 are respectively a perspective view and a top view of the turbine 220A in a closed status. When each blade 222 is in the closed position, the active side 232 of each blade 222 is adjacent to the rotary body 221 (the concave surface 229 of each blade 222 is adjacent to the rotary body 221), and the angle θ between the connecting side 231 of each blade 222 and the tangent of the rotary body 221 corresponding thereto is approximately 0. The connecting side 231 of each blade 222 is not against the corresponding stopper 225, and meanwhile, the elastic members 226 are deformed (e.g. stretched) and provide restoration forces to open the blades 222.

It should be noted that the elastic members 226 corresponding to the blades 222 are also deformed (e.g. stretched) when the blades 222 are in the expanded positions, but the degree of deformations of the elastic members 226 when the blades 222 are in the expanded positions is less than the degree of deformations of the elastic members 226 when the blades 222 are in the closed positions. For example, each elastic member 226 is stretched to generate a first elongation when the blades 222 are in the expanded positions. Each elastic member 226 is stretched to generate a second elongation when the blades 222 are in the closed positions. The second elongation is longer than the first elongation. Accordingly, the blades 222 do not rotate toward a direction of the closed positions and sustain in the expanded positions without external force because the blades 222 are against the stoppers 225 when the blades 222 do not affect by the external force from a spacing wall 241 (see FIG. 6).

Figure 6:
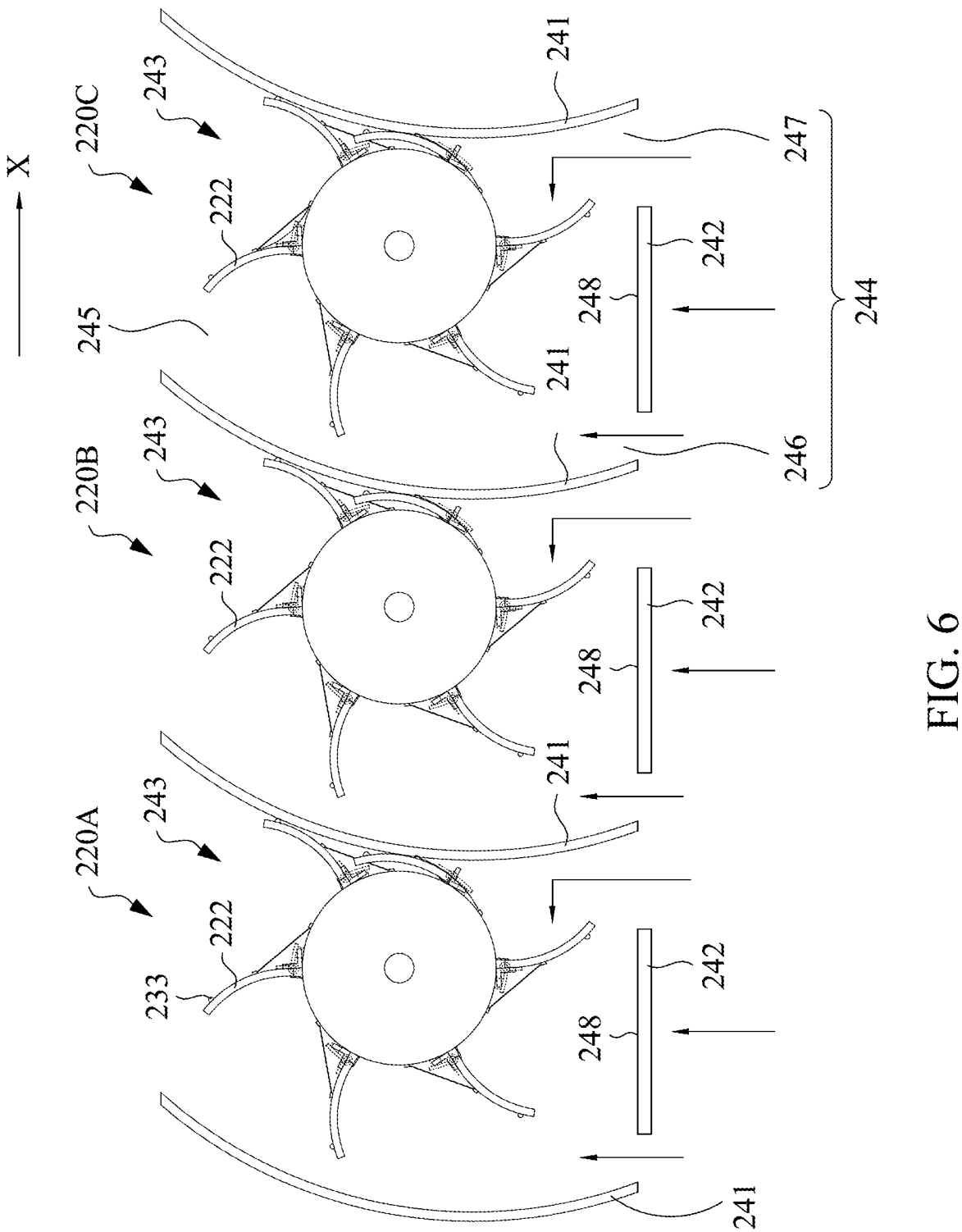
FIG. 6 is a schematic diagram of a power apparatus of a fluid flowing in accordance with some embodiments of the present disclosure.

FIG. 6 exemplarily illustrates fluid flowing to the power apparatus 200. As shown in FIGS. 1A, 1B and 6, the channel structure group 240 includes spacing walls 241 and diversion walls 242. Other number of diversion walls (e.g., 1, 2, or more) may be arranged in the channel structure group 240 in accordance with other embodiments. The spacing walls 241 are arranged at intervals along the direction X. Any two adjacent ones of the spacing walls 241 define a channel space 243 which is opening, and form an inlet 244 and an outlet 245 communicating with each other through the channel space 243. Each channel space 243 is provided for accommodating the turbine 220A, 220B or 220C, and the accommodated turbine 220A, 220B or 220C is adjacent to one of the spacing walls 241. The spacing wall 241 is curved along a rotational direction of the accommodated turbines 220A, 220B and 220C so that the fluid flowing into the channel spaces 243 are guided by the spacing walls 241 to drive more blades 222 of the accommodated turbines 220A, 220B and 220C. Each diversion wall 242 is disposed between any adjacent two of the spacing walls 241 to occupy a portion of the inlet 244, and divides the inlet 244 into two sub-inlets 246 and 247 for diverting fluid.

Reference is made to FIGS. 2 and 4 together. The fluid is diverted into two diverted fluids by each diversion wall 242, in which the diverted fluid entering the channel space 243 from the sub-inlet 246 may drive the turbine 220A, 220B or 220C to rotate, and a part of the diverted fluid entering the channel space 243 from the sub-inlet 247 can flow toward a direction near the sub-inlet 246 to form tangential fluid to the turbine 220A, 220B or 220C. When the fluid flows into the channel spaces 243 from the sub-inlets 246 and 247, the turbines 220A, 220B and 220C are driven to rotate by the fluid (in this example, the rotational direction is clockwise), and the blades 222 of the turbines 220A, 220B and 220C touch the adjacent spacing walls 241 and move to the closed positions to close near the rotary bodies 221 through the effects of reaction forces of the spacing walls 241. When the closed blades 222 are near the corresponding diversion walls 242, the closed blades 222 are expanded again through supports of the tangential fluids formed by flowing the corresponding diversion walls 242 and the effects of the resilience of the corresponding elastic members 226. The blades 222 which are not completely expanded to the expanded positions may be smoothly expanded by the corresponding diversion walls 242 blocking the fluid flowing directly toward the convex surfaces 230.

In some embodiments, inner surfaces 248 of the diversion walls 242 respectively facing the channel spaces 243 are curved surfaces, and extend toward interior of the channel spaces 243 in a direction from the sub-inlets 247 to the sub-inlets 246, so that the diverted fluids entering the channel spaces 243 from the sub-inlets 247 form the tangential fluids more easily.

The turbines 220A, 220B and 220C reduce obstacles by the expanded blades 222 or the closed blades 222 when rotating, and eliminate negative power of rotation, so that the turbines 220A, 220B and 220C increase efficiency of converting fluid kinetic energy into mechanical energy.

It should be further noted that each diversion wall 242 may be disposed near one of the adjacent two of the spacing walls 241 which is different from the one of the adjacent two of the spacing walls 241 which is near the accommodated turbine 220A, 220B or 220C, so that the sub-inlet 247 is wider than the sub-inlet 246. The amount of the diverted fluid entering the sub-inlet 247 is more than the amount of the diverted fluid entering the sub-inlet 246, so the diverted fluid entering the sub-inlet 247 may form the stronger tangential fluid so that the blades 222 of the turbine 220A, 220B or 220C are expanded more quickly. The positions disposed by the diversion walls 242 may be adjusted to match the positions where the blades 222 of the corresponding turbines 220A, 220B and 220C need to be expanded. In addition, the flows of the diverted fluids may be adjusted according to adjusting distances between each diversion wall 242 and the corresponding spacing walls 241. For example, when the diversion wall 242 is near one of the spacing walls 241, the space defined by the diversion wall 242 and the spacing wall 241 which is near the diversion wall 242 is smaller, and thus the flow amount of the diverted fluid entering the space is smaller; on the contrary, when the diversion wall 242 is far away from one of the spacing walls 241, the space defined by the diversion wall 242 and the spacing wall 241 which is far away from the diversion wall 242 is large, and thus the flow amount of the diverted fluid entering the space is larger.

In some embodiments, each turbine 220A, 220B or 220C further includes anti-friction members 233, in which the anti-friction members 233 are disposed on the convex surfaces 230 of the blades 222. These anti-friction members 233 are helpful for reducing the friction force exerted by the blades 222 on the spacing walls 241. The anti-friction members 233 may be, for example, rollers and/or smooth coatings.

In some embodiments, the channel structure group 240 further includes anti-friction members (not shown) disposed respectively on contact surfaces of the spacing walls 241. These anti-friction members are helpful for reducing the friction force exerted by the spacing walls 241 on the blades 222. Each anti-friction member may be, for example, a row of rollers and/or a smooth coating.

Each one-way transmission mechanism 300 includes a one-way transmission wheel 310 and a transmission member 320. The one-way transmission wheel 310 is disposed on the rod 228 of one of the turbines 220A, 220B and 220C. The one-way transmission wheel 310 is configured to rotate by a unidirectional direction to transmit power, such as a ratcheting freewheel mechanism, a combination of a one-way bearing and a gear, a combination of a one-way bearing and a pulley, or the like, in which the combination method of the one-way bearing and the gear is that the one-way bearing is disposed at the center of the gear, and the combination method of the one-way bearing and the pulley is that the one-way bearing is disposed at the center of the pulley. The transmission member 320 is disposed between the rod 228 of another turbine 220A, 220B or 220C and the one-way transmission wheel 310. The transmission members 320 transmit power generated by the turbines 220A and 220C to the corresponding one-way transmission wheels 310, and the one-way transmission wheels 310 transmit power generated by the turbines 220A and 220C to the rod 228 of the turbines 220A. The transmission members 320 and the corresponding one-way transmission wheels 310 incorporate together. For example, as shown in FIG. 1A, the transmission member 320 may include an assembly of a gear 321 and a chain 322. Alternatively, the transmission member 320 may include an assembly of a pulley and a belt, or a gear assembly, in which the gear assembly is an assembly of gears and two adjacent ones of the gears are engaged. When the one-way transmission wheel 310 is the ratcheting freewheel mechanism or the combination of the one-way bearing and the gear, the transmission member 320 is the assembly of the gear 321 and the chain 322, or the gear assembly. When the one-way transmission wheel 310 is the combination of the one-way bearing and the pulley, the transmission member 320 is the assembly of the pulley and the belt. The one-way transmission mechanism 300 is configured to transmit the power to the one-way transmission wheel 310 via the transmission member 320 when the rod 228 where the transmission member 320 is disposed rotates in a rotational direction, so that the rod 228 where the one-way transmission wheel 310 is disposed rotates in the same rotational direction. In the example illustrated in FIG. 1A, two one-way transmission mechanisms 300 are arranged. One of the one-way transmission mechanisms 300 is disposed on the turbines 220A and 220B, and the one-way transmission wheel 310 of which is disposed on the turbine 220B. The other one-way transmission mechanism 300 is disposed on the turbines 220B and 220C, and the one-way transmission wheel 310 of which is disposed on the turbine 220B. The rod 228 of the turbine 220B is interlocked with a shaft 410 of the power generator 400. The turbine 220B rotating in a rotational direction generates and transmits power directly to the power generator 400. When the rods 228 of the turbines 220A and 220C rotate in the same rotational direction, the turbines 220A and 220C generate and transmit power to the power generator 400 in parallel via the one-way transmission mechanisms 300 and the shaft 410. In particular, for the configuration shown in FIGS. 1A and 1B, the turbine 220A transmits power to the turbine 220B via the one-way transmission mechanism 300 between the turbines 220A and 220B, and the turbine 220C transmits power to the turbine 220B via the one-way transmission mechanism 300 between the turbines 220B and 220C, and the turbine 220B integrates and transmits power to the power generator via the rod 228 thereof and the shaft 410 of the power generator 400.

When the rotation speed of the turbines 220A and 220C is higher than or equal to the rotation speed of the turbine 220B for following the rotation of the turbine 220B, the turbines 220A and 220C may transmit power via the one-way transmission mechanisms 300, so that the turbines 220A and 220C share the force that drives the turbine 220B to rotate, such that the turbine 220B rotates more easily. Therefore, the configurations of the one-way transmission mechanisms 300 can be adjusted appropriately according to different components of the force generated by the fluid to the turbines 220A, 220B and 220C.

It should be mentioned that the one-way transmission mechanisms 300 may be used for power devices other than the turbines 220A, 220B and 220C. In some embodiments, the one-way transmission mechanisms 300 are disposed on rotation shafts of power devices (e.g., another type of waterwheels).

Figure 7:
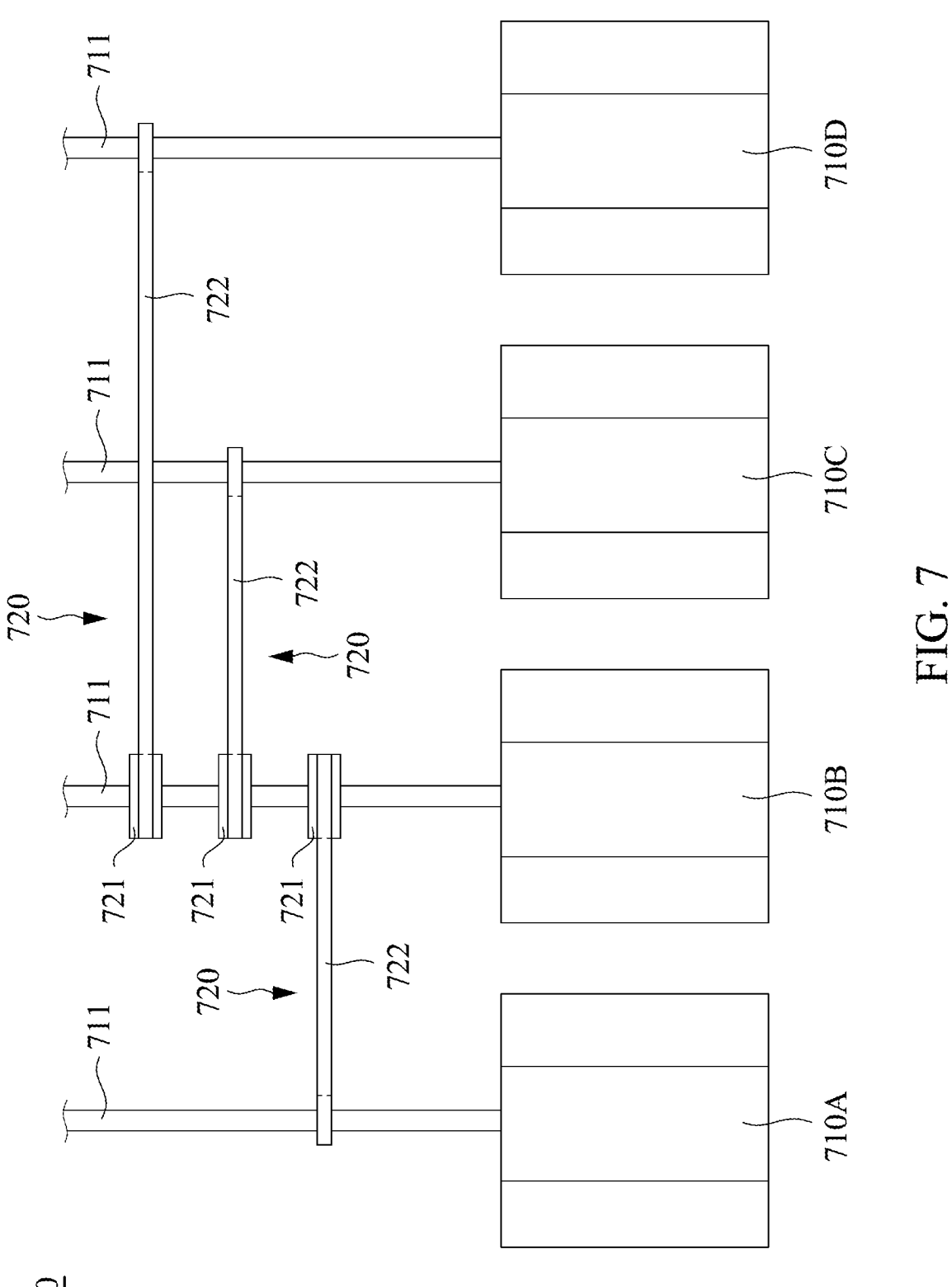
FIG. 7 is a schematic diagram of a power integrated system of the power generating system for integrating the power in parallel in accordance with some embodiments of the present disclosure.

FIG. 7 is a schematic side view of a power integration system of a power generating system 700 for integrating power in parallel in accordance with some embodiments of the present disclosure. In this example, four power devices 710A, 710B, 710C and 710D and three one-way transmission mechanisms 720 are configured. Rotary bodies 711 of the power devices 710A, 710B, 710C and 710D are driven to rotate for generating power. The power devices 710A, 710B, 710C and 710D may be turbines, waterwheels, wind power devices, or the like, in which rotary bodies of the wind power devices are driven by wind for generating power. The one-way transmission mechanisms 720 are similar to the one-way transmission mechanisms 300 in structure, and thus the descriptions thereof are not repeated herein.

In the power generating system 700 shown in FIG. 7, one of the one-way transmission mechanisms 720 is disposed on the power devices 710A and 710B, and a one-way transmission wheel 721 of which is disposed on the power device 710B. Another one-way transmission mechanism 720 is disposed on the power devices 710B and 710C, and a one-way transmission wheel 721 of which is disposed on the power device 710B. The other one-way transmission mechanism 720 is disposed on the power devices 710B and 710D, and a one-way transmission wheel 721 of which is disposed on the power device 710B. The rotary body 711 of the power device 710B is interlocked with a shaft of a power generator (not shown). The power device 710B rotating in a rotational direction generates and transmits power directly to the power generator. When the rotary bodies 711 of the power devices 710A, 710C and 710D rotate in the same rotational direction, the power devices 710A, 710C and 710D generate and transmit power to the power generator in parallel via the one-way transmission mechanisms 720 and the shaft of the power generator.

Figure 8:
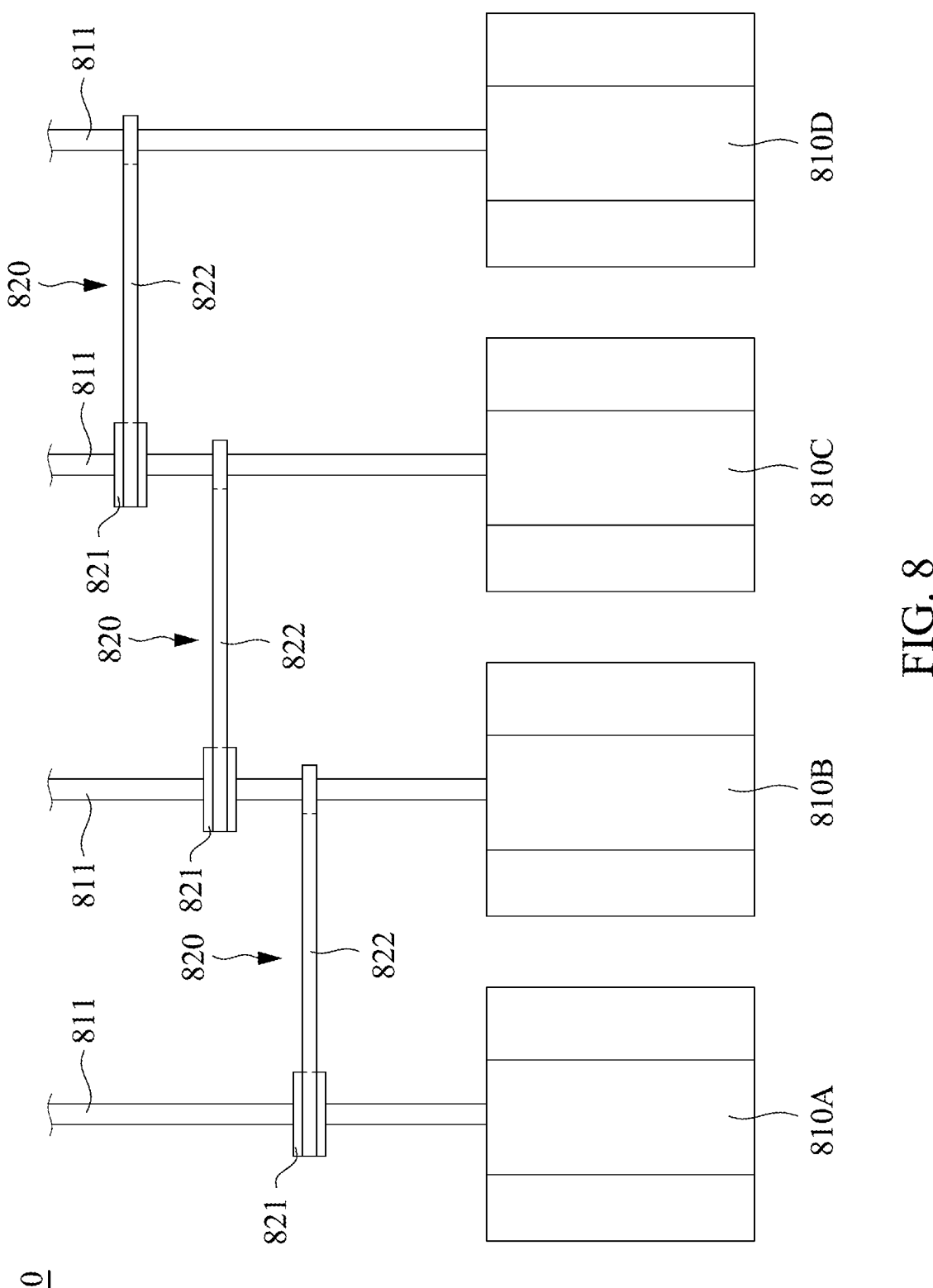
FIG. 8 is a schematic diagram of a power integrated system of the power generating system for integrating the power in series in accordance with some embodiments of the present disclosure.

FIG. 8 is a schematic side view of a power integration system of a power generating system 800 for integrating power in series in accordance with some embodiments of the present disclosure. In this example, four power devices 810A, 810B, 810C and 810D and three one-way transmission mechanisms 820 are configured. In other embodiment, two power devices and one one-way transmission mechanism are configured. Rotary bodies 811 of the power devices 810A, 810B, 810C and 810D are driven to rotate for generating power. The power devices 810A, 810B, 810C and 810D may be turbines, waterwheels, wind power devices, or the like, in which rotary bodies of the wind power devices are driven by wind for generating power. The one-way transmission mechanisms 820 are similar to the one-way transmission mechanisms 300 in structure, and thus the descriptions thereof are not repeated herein.

In the power generating system 800 shown in FIG. 8, one of the one-way transmission mechanisms 820 is disposed on the power devices 810A and 810B, and a one-way transmission wheel 821 of which is disposed on the power device 810A. Another one-way transmission mechanism 820 is disposed on the power devices 810B and 810C, and a one-way transmission wheel 821 of which is disposed on the power device 810B. The other one-way transmission mechanism 820 is disposed on the power devices 810C and 810D, and a one-way transmission wheel 821 of which is disposed on the power device 810C. The rotary body 811 of any of the power devices 810A, 810B and 810C is interlocked with a shaft of a power generator (not shown). It is described for this example that the rotary body 811 of the power device 810A is interlocked with the shaft of the power generator. The power device 810A rotating in a rotational direction generates and transmits power directly to the power generator. When the rotary bodies 811 of the power devices 810B, 810C and 810D rotate in the same rotational direction, the power devices 810B, 810C and 810D generate and transmit power to the power generator via the one-way transmission mechanisms 820 and the shaft of the power generator. In particular, for the configuration shown in FIG. 8, the power device 810D transmits power to the power device 810C via the one-way transmission mechanism 820 between the power devices 810C and 810D, and then the power device 810C integrate and transmit power to the power device 810B via the one-way transmission mechanism 820 between the power devices 810B and 810C, and then the power device 810B integrates and transmits power to the power device 810A via the one-way transmission mechanism 820 between the power devices 810A and 810B, and last the power device 810A integrates and transmits power to the power generator via the rotary body 811 thereof and the shaft of the power generator. That is, the power generated by the power devices 810A, 810B, 810C and 810D is integrated in series in a unidirectional power transmission path from the power device 810D to the power device 810A and then transmitted to the power generator via the rotary body 811 of the power device 810A at an endpoint of the unidirectional power transmission path.

The power devices can be disposed as appropriate positions and the power generated by the power devices can be integrated in series or in parallel via the one-way transmission mechanisms, so that the power devices can be disposed more conveniently and the amounts of the power generators which are required can be saved. In addition, the power devices may share the momentum of the fluid at the same time to reduce damages of the power devices. In some embodiments, the power integrated system may be integrated with other fluid power generating system(s) (e.g., a wind power generating system) to generate power by integrating wind turbines.

Figure 9:
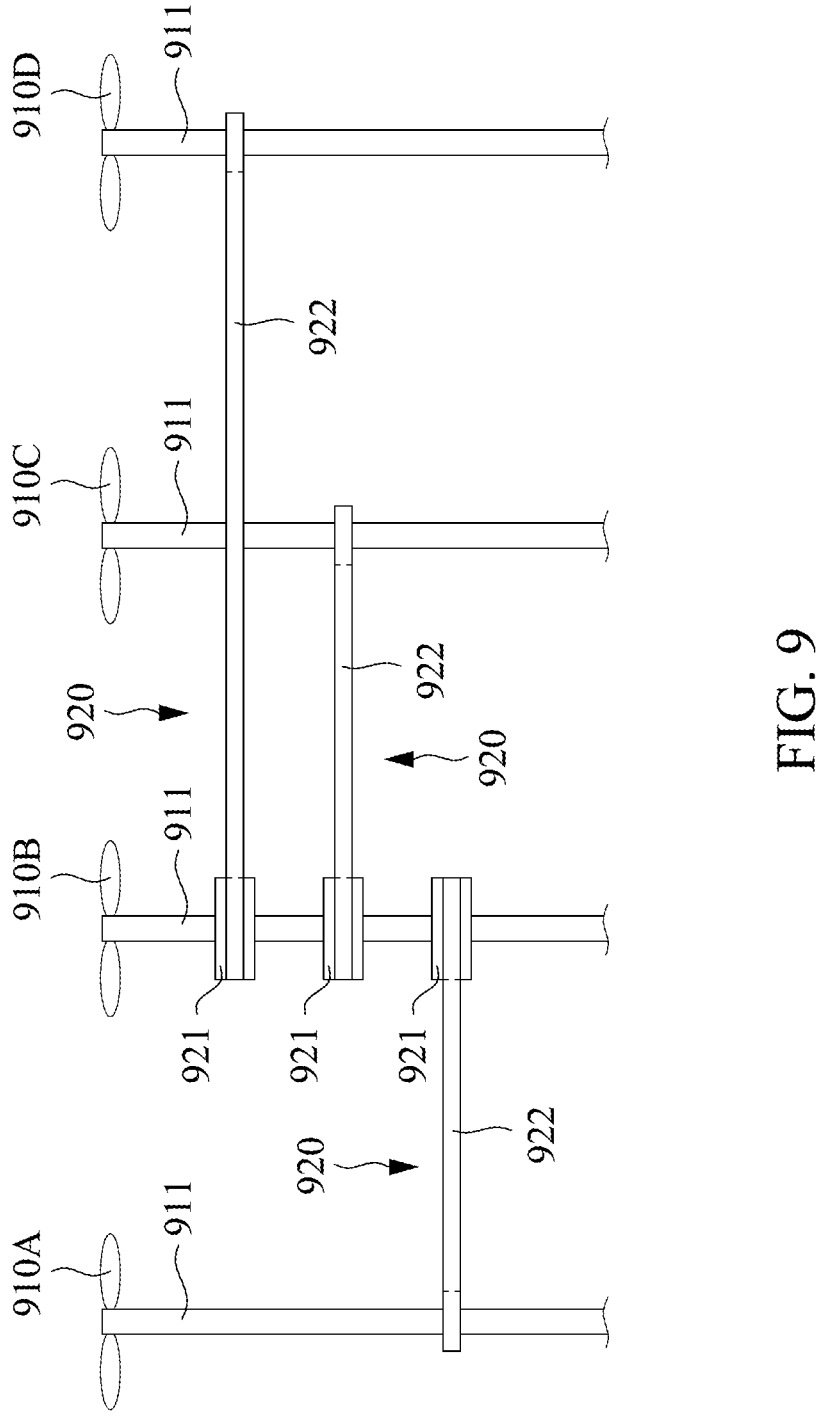
FIG. 9 is a schematic diagram of a power integrated system with a wind power system for integrating the power in parallel in accordance with some embodiments of the present disclosure.

FIG. 9 is a schematic side view of a power integrated system with a wind power system 900 that integrates the power in parallel in accordance with some embodiments of the present disclosure. In this example, four wind power devices 910A, 910B, 910C and 910D and three one-way transmission mechanisms 920 are configured. Rotary bodies 911 of the wind power devices 910A, 910B, 910C and 910D are driven by wind to rotate for generating power. The one-way transmission mechanisms 920 are similar to the one-way transmission mechanisms 300 in structure, and the arrangement of the one-way transmission mechanisms 920 in FIG. 9 are similar to the arrangement of the one-way transmission mechanisms 720 in FIG. 7.

In the power integrated system shown in FIG. 9, one of the one-way transmission mechanisms 920 is disposed on the wind power devices 910A and 910B, and a one-way transmission wheel 921 of which is disposed on the wind power device 910B. Another one-way transmission mechanism 920 is disposed on the wind power devices 910B and 910C, and a one-way transmission wheel 921 of which is disposed on the wind power device 910B. The other one-way transmission mechanism 920 is disposed on the wind power devices 910B and 910D, and a one-way transmission wheel 921 of which is disposed on the wind power device 910B. The rotary body 911 of the wind power device 910B is interlocked with a shaft of a power generator (not shown). The wind power device 910B rotating in a rotational direction generates and transmits power directly to the power generator. When the rotary bodies 911 of the wind power devices 910A, 910C and 910D rotate in the same rotational direction, the wind power devices 910A, 910C and 910D generate and transmit power to the power generator in parallel via the one-way transmission mechanisms 920 and the shaft of the power generator.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of the present disclosure provided they fall within the scope of the following claims.

What is claimed is:

1. A turbine of a power generating system, comprising:
a rotary body comprising a rod and a core, wherein the rod is disposed in the core and is firmly engaged to the core, wherein the rotary body is rotated by fluid power;
a plurality of blades, wherein the blades are disposed on the core at regular intervals based on a predetermined distance, wherein each of the blades comprises:
an incoming surface pushed by a fluid;
a back surface opposite to the incoming surface;
a first edge surface connected between the incoming surface and the back surface, wherein the first edge surface of each of the blades is pivotally connected to the core; and
a second edge surface connected between the incoming surface and the back surface, wherein the second edge surface is opposite to the first edge surface;
a plurality of stoppers disposed over the core, wherein the stoppers are correspondingly adjacent to the blades; and a plurality of elastic members, wherein each of the elastic members comprises a fixed end and a moving end opposite to the fixed end, and the fixed ends attach to the core, and the moving ends respectively attach to the back surfaces of the blades, wherein each of the elastic members is stretched;
wherein each of the blades pivots between an expanded position and a closed position;
wherein the blades are respectively against the stoppers in the expanded positions:
wherein a first distance is formed between each of the second edge surfaces and the core as the blades are in the expanded positions, a second distance is formed between each of the second edge surfaces and the core as the blades are in the closed positions, the first distance is greater than the second distance; and
wherein each of the elastic members is stretched to generate a first elongation as the blades are in the expanded positions, each of the elastic members is stretched to generate a second elongation as the blades are in the closed positions, the second elongation is longer than the first elongation.

2. The turbine of the power generating system of claim 1, wherein the core is in a cylinder shape, the blades are disposed at intervals in a circumferential direction of the core, each of the blades is a curved plate, the incoming surface is a concave surface, the back surface is a convex surface, and the stoppers are respectively disposed corresponding to the blades and face the convex surfaces of the corresponding blades;
wherein the convex surfaces of the blades are respectively against the stoppers as the blades are in the expanded positions; and
wherein the concave surfaces of the blades are adjacent to the core, and a radius of a curvature of each of the blades is substantially equivalent to a radius of the core as the blades are in the closed positions.

3. The turbine of the power generating system of claim 1, further comprising a plurality of anti-friction members respectively disposed on the blades, and each of the anti-friction members comprising one of a roller and a coating.

4. The turbine of the power generating system of claim 1, further comprising a plurality of pivotal members and a plurality of cover sheets, wherein the pivotal members are disposed between the blades and the core so that the blades pivot relative to the core, and the cover sheets are respectively disposed across gaps between the blades and the core.

5. A power apparatus of a power generating system, wherein the power apparatus comprises:
at least one turbine, wherein the at least one turbine comprises:
a rotary body comprising a rod and a core, wherein the rod is disposed in the core and is firmly engaged to the core, wherein the rotary body is rotated by fluid power;
a plurality of blades, wherein the blades are pivotally connected to the core at regular intervals based on a predetermined distance, and each of the blades comprises:
an incoming surface pushed by a fluid;
a back surface opposite to the incoming surface;
a first edge surface connected between the incoming surface and the back surface, wherein the first edge surface of each of the blades is pivotally connected to the core; and a second edge surface connected between the incoming surface and the back surface, wherein the second edge surface is opposite to the first edge surface;

a plurality of stoppers disposed over the core, wherein the stoppers are correspondingly adjacent to the blades; and a plurality of elastic members, wherein each of the elastic members comprises a fixed end and a moving end opposite to the fixed end, and the fixed ends attach to the core, and the moving ends respectively attach to the back surfaces of the blades, wherein each of the elastic members is stretched;

a channel structure group comprising a plurality of spacing walls disposed at intervals along a direction, wherein any two adjacent ones of the spacing walls define a channel space for accommodating the at least one turbine, and the at least one turbine is adjacent to one of the two adjacent ones of the spacing walls; and wherein each of the blades pivots between an expanded position and a closed position;

wherein the blades are respectively against the stoppers in the expanded positions;

wherein the blades are in the closed positions due to a press on the adjacent one of the two adjacent ones of the spacing walls;

wherein a first distance is formed between each of the second edge surfaces and the core as the blades are in the expanded positions, a second distance is formed between each of the second edge surfaces and the core as the blades are in the closed positions, the first distance is greater than the second distance; and wherein each of the elastic members is stretched to generate a first elongation as the blades are in the expanded positions, each of the elastic members is stretched to generate a second elongation as the blades are in the closed positions, the second elongation is longer than the first elongation.

6. The power apparatus of the power generating system of claim 5, wherein the channel structure group further comprises at least one diversion wall, the at least one diversion wall is disposed between any adjacent two of the spacing walls to divide an inlet that communicates with the channel space into two sub-inlets.

7. The power apparatus of the power generating system of claim 6, wherein the at least one diversion wall occupies a portion of the inlet and extends in a direction from one of the sub-inlets to the other one of the sub-inlets.

8. The power apparatus of the power generating system of claim 6, wherein the at least one diversion wall is adjacent to one of the adjacent two of the spacing walls.

9. The power apparatus of the power generating system of claim 6, wherein an inner surface of the at least one diversion wall facing the channel space is a curved surface.

10. The power apparatus of the power generating system of claim 5, wherein each of the spacing walls is curved along a rotational direction of the at least one turbine.

11. The power apparatus of the power generating system of claim 5, wherein the channel structure group further comprises a plurality of anti-friction members, each of the anti-friction members comprises one of a roller and a coating, each of the spacing walls comprises a contact surface that is pressed by the at least one turbine, the anti-friction members are respectively disposed on the contact surfaces of the spacing walls.

12. A power integrated system of a power generating system, wherein the power integrated system comprises:

a plurality of power devices comprising a first power device, a second power device, and a third power device, wherein each of the first power device, the second power device, and the third power device comprises a rotary body, and the rotary bodies are driven by fluid power to rotate for generating power, wherein each of the rotary bodies comprises a rod and a core, and the rod is disposed in the core and is firmly engaged to the core; and a plurality of one-way transmission mechanisms comprising a first one-way transmission mechanism and a second one-way transmission mechanism, wherein each of the first one-way transmission mechanism and the second one-way transmission mechanism comprises a one-way transmission wheel and a transmission member that is disposed on the one-way transmission wheel, wherein the one-way transmission wheel of the first one-way transmission mechanism is disposed on the rod of the second power device, and the transmission member of the first one-way transmission mechanism is disposed on the rod of the first power device, wherein the one-way transmission wheel of the second one-way transmission mechanism is disposed on the rod of the second power device, and the transmission member of the second one-way transmission mechanism is disposed on the rod of the third power device;

wherein the transmission members are configured to respectively transmit powers generated by the first power device and the third power device to the one-way transmission wheels, and the one-way transmission wheels are configured to transmit the powers to the second power device; and wherein the one-way transmission mechanisms are configured to transmit the powers to the second power device as the rods of the first power device and the third power device are rotated in a rotational direction, and the rod of the second power device is rotated in the same rotational direction.

13. The power integrated system of the power generating system of claim 12, wherein the one-way transmission wheel of each of the one-way transmission mechanisms comprises one of a ratcheting freewheel mechanism, a combination of a one-way bearing and a gear, and a combination of a one-way bearing and a pulley, and the transmission member of each of the one-way transmission mechanisms comprises one of an assembly of a gear and a chain, an assembly of a pulley and a belt, and a gear assembly.

14. The power integrated system of the power generating system of claim 12, wherein each of the power devices is a waterwheel.

15. The power integrated system of the power generating system of claim 12, wherein the rotary body of each of the power devices is driven by wind for generating power.

* * * * *